United States Patent
Partain et al.

(10) Patent No.: US 7,941,343 B1
(45) Date of Patent: May 10, 2011

(54) METHOD AND SYSTEM FOR ENHANCING PRODUCT SALES IN NETWORK TRANSACTIONS

(75) Inventors: Mika Partain, Torrance, CA (US); Kaoru Katayama, Tustin, CA (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 70 days.

(21) Appl. No.: 09/760,864

(22) Filed: Jan. 16, 2001

(51) Int. Cl.
*G06Q 30/00* (2006.01)
(52) U.S. Cl. .................... 705/26.1; 705/14.23; 705/27.1
(58) Field of Classification Search ............. 705/26–27, 705/14, 25
See application file for complete search history.

(56) References Cited

U.S. PATENT DOCUMENTS

| | | | | |
|---|---|---|---|---|
| 5,999,914 A * | 12/1999 | Blinn et al. | ...................... | 705/26 |
| 6,078,897 A * | 6/2000 | Rubin et al. | .................... | 705/14 |
| 6,332,126 B1 * | 12/2001 | Peirce et al. | .................... | 705/14 |
| 6,360,206 B1 * | 3/2002 | Yamashita | ...................... | 705/14 |
| 7,124,099 B2 * | 10/2006 | Mesaros | ........................ | 705/26 |
| 2002/0055880 A1* | 5/2002 | Unold et al. | .................... | 705/26 |
| 2006/0218054 A1* | 9/2006 | Postelnik et al. | ............... | 705/26 |

OTHER PUBLICATIONS

"Creating a great e-commerce business" Gurley, J. William. Fortune. Mar. 16, 1998. Retrieved via Proquest on Dec. 23, 2010.*

* cited by examiner

*Primary Examiner* — Michael A. Misiaszek
(74) *Attorney, Agent, or Firm* — Cooper & Dunham LLP (57) ABSTRACT

A method and system for enhancing the sales potential of transactions conducted over the Internet or other networks though selectively offered promotions functionally related to an initial order.

19 Claims, 7 Drawing Sheets

METHOD AND SYSTEM FOR ENHANCING PRODUCT SALES IN NETWORK TRANSACTIONS

FIELD

This patent specification is in the field of methods and systems for carrying out sales transactions over networks such as the Internet.

BACKGROUND

Sales transactions over networks such as the Internet are a rapidly growing business. Many companies that manufacture or market products have developed sites that enable customers to order products over networks such as the Internet using personal computers, Internet appliances or other communication devices such as Internet-enabled wireless devices. Companies often advertize various promotions on their Web sites, such as time-limited or quantity-related promotions. For example, a company might offer a reduced price or some other benefit to a customer who places an order by a certain time and/or orders a quantity or a value that meets or exceeds some minimum. Typically, the Web site offers information regarding such promotions in a way that is not directly or consistently tied to the sales potential of the transaction. For example, a Web site might offer the same promotion to customers that are more likely to respond to different promotions. As a simplified example, a customer who is ordering five CD-R discs might consider increasing the order in response to a promotion for a price break on an order of 10 but not on an order of 50 discs. Conversely, a customer ordering 40 discs might consider increasing the order in response to a promotion for a price break on an order 50 but might not be have an interest in a price breaks on an order of 10 disc. As another simplified example, a promotion that might be effective in a retail customer-to-business (C2B) sale might not be effective in a business-to-business (B2B) sale, and vice versa, but it might not always be apparent whether a client transacting business with a company's Web site is a retail customer or a business. A retail customer who would typically place a relatively small order might on occasion purchase a quantity more typical of a business customer, while a business on occasion might make a relatively small purchase. If a company's Web site simply has one area or procedure for retail customers and another for business customers, it might not provide promotion information that is likely to enhance the sale if a retail customer is placing a relatively large order or a business a relatively small order. It is believed that in general Internet sales transactions have not fully utilized the potential to enhance sales.

SUMMARY

An object of this patent disclosure is to enhance sales transactions over networks such as the Internet to better utilize the sales potential and to overcome limitations present in known systems.

One preferred but not limiting embodiment involves improved utilization of sales potential in Internet transactions through offering promotion functionally related to an order the customer places. The Internet seller treats the order as an initial order that is automatically analyzed in light of current promotions that pertain to the product ordered and the quantity requested in the initial order. For example, if the quantity ordered is in a first range, the order may simply be executed without delay. If the quantity is in a second, higher range, a promotion functionally related to that quantity may be offered so the customer may elect to confirm the initial order or place a revised order that conforms to the promotion and provides the benefit the promotion provides. If the quantity specified in the initial order is in a third, even higher range, the order may be treated not as a retail order but one involved in a business-to-business transaction, and the customer may be advised of promotions and terms suitable for a business customer.

In an exemplary process of promoting product sales in Internet transactions, display information is delivered to a customer side, for example a display screen on the customer's personal computer (PC) where the customer places an initial order by entering order information. In response to an initial from the customer side for a specified product and a specified quantity thereof that is in a first selected range, order processing takes place that involves delivering order processing information to the customer side and executing the order at a seller side. However, in response to an initial order for a specified product and a specified quantity thereof that is in a second selected range higher than the first range, the customer side receives display information indicative of at least a first promotion functionally related to the initial order that is within said first range. In response, the customer can elect to simply confirm the initial order, in which case the order simply get executed. However, if the customer elects to revise the order and enters information to that effect at the customer side that conforms to the first promotion, the initial order is no longer operative at the seller side and execution of the revised order takes place at or for the seller side. Further, if the initial order entered at the customer side is for a specified product and quantity thereof that is in a third range higher than the second range, the seller side can deliver to the customer side display information indicative of at least a second promotion that is different from the first promotion and is functionally related to the initial order that is in said second range. Then, in response to an entry at the customer side of a second revised order conforming to the second promotion, the seller side executes the second revised order as the initial order is no longer operative. The first promotion can be for a retail sales transaction and said second promotion can be for a business-to-business transaction. The promotions and the benefits they offer to the customer can be geared to the initial order in many ways, depending not only or necessarily on quantity initially orders but on many other factors as well, suited to the particular business served by the system and method disclosed herein.

BRIEF DESCRIPTION OF THE DRAWING

FIGS. 2-1, 2-2, 2-3 and 2-4 illustrate information included in a computer display screen according to preferred embodiments.

FIGS. 3-1, 3-2 and 3-3 are functional flow chart illustrating processes in accordance with preferred embodiments.

DETAILED DESCRIPTION OF PREFERRED EMBODIMENTS

Figure 1:
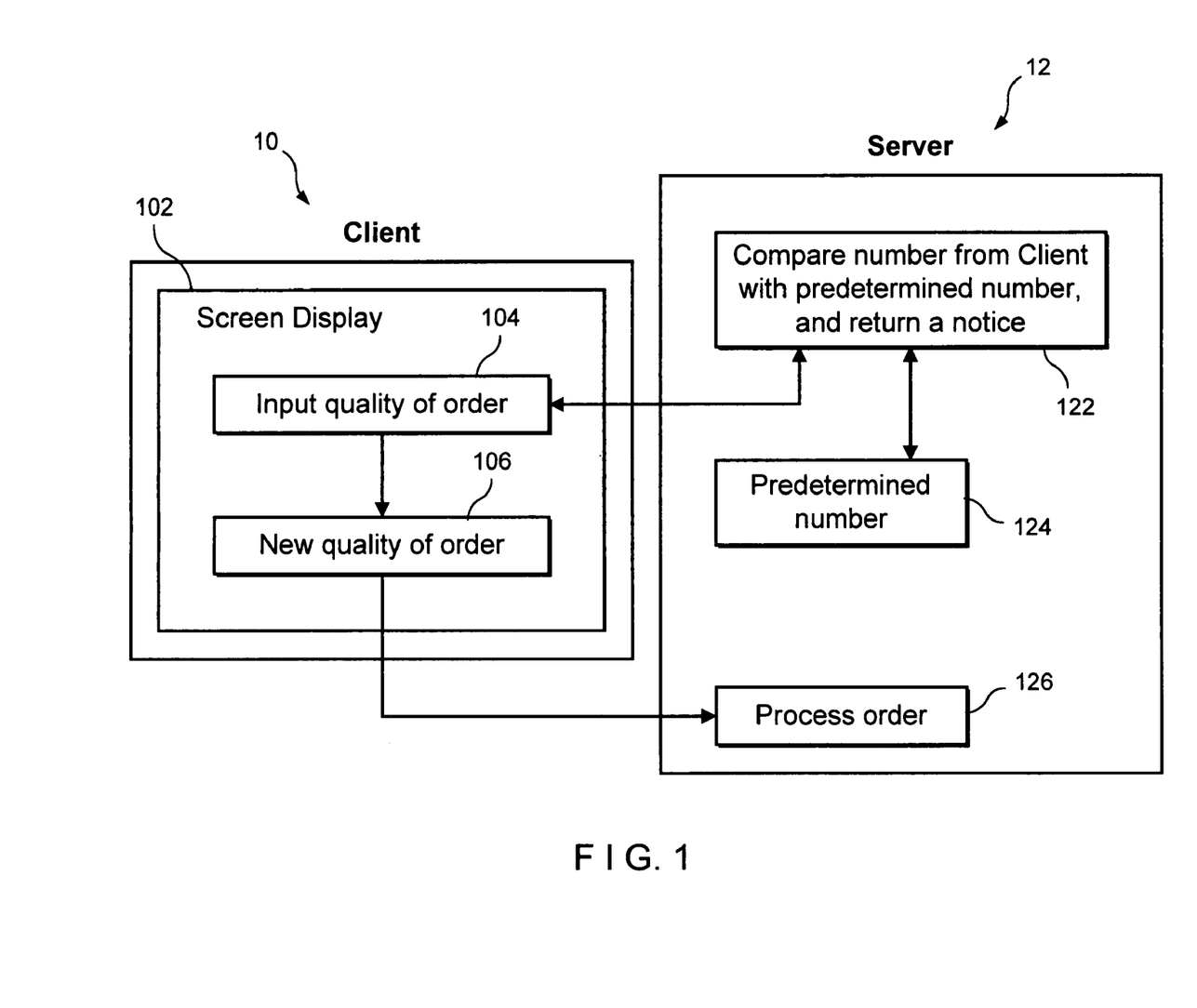
FIG. 1 is a functional block diagram illustrating a customer side and a seller side communicating for a sales transaction via a network such as the Internet.

Referring to FIG. 1, a customer side 10 communicates over a network such as the Internet with a seller side 12. Customer side 10 can include any hardware and software suitable for such communications, such as a personal computer, an Internet appliance or some other communication device, for example an Internet-enabled wireless device, and typically includes a screen display 102 such as a computer screen, and devices 104 and 106 allowing the customer to enter an initial order such as a keyboard, a pointing device, etc. Devices 104 and 106 can comprise the same device used for different purposes at different steps in the process. Customer side 10 further includes conventional means, not expressly shown, for sending and receiving information via the Internet in carrying out an Internet sales transaction. Seller side 12 typically comprises one or more servers operated by or for a seller of products, and can be implemented in many different ways. The main portions thereof relevant here are means, not expressly shown, for receiving and sending information via the Internet, a computer facility 122 that can compare characteristics of an initial order from customer side 10, such as number or quantity of products included in the initial order, with predetermined characteristics from storage 124, and a facility for processing a customer's order for execution. While functional blocks are shown in FIG. 1 and other figures as separate entities, they may be combined so the same hardware/software performs different functions at different times.

In a non-limiting example of an Internet sales transaction, a customer views at screen display 102 a screen display such as a Web page or an order form provided by or for seller side 12 and enters an initial order at 104, for example for a specified quantity of a specified product or a specified number of units of the product. The initial order is transmitted via the Internet to seller side 12, where it is compared at 122 with a predetermined quantity or number of units from 124. If the quantity the initial order specifies is in a first range relative to the predetermined number from 124, seller side 12 may simply process the initial order at 126. In the quantity is in a second range, typically higher than the first, seller side 12 may cause customer side display 102 to show information describing a promotion functionally related to the initial order and designed to induce a revised order in exchange for benefits that promotion offers. If the customer enters a revised order at 106 that conforms to the promotion, for example by meeting terms specified in the promotion, and this is verified at seller side 12, the revised order is processed at 126 and executed. Preferably, seller side further determines if the initial order should be treated as a business-to-business (B2B) transaction, in which case it may supply customer side with information describing a different promotion and/or different terms, so the customer may enter at 106 a revised order that conforms to the different promotion and seller side 12 can process that order at 126.

Figure 2A:
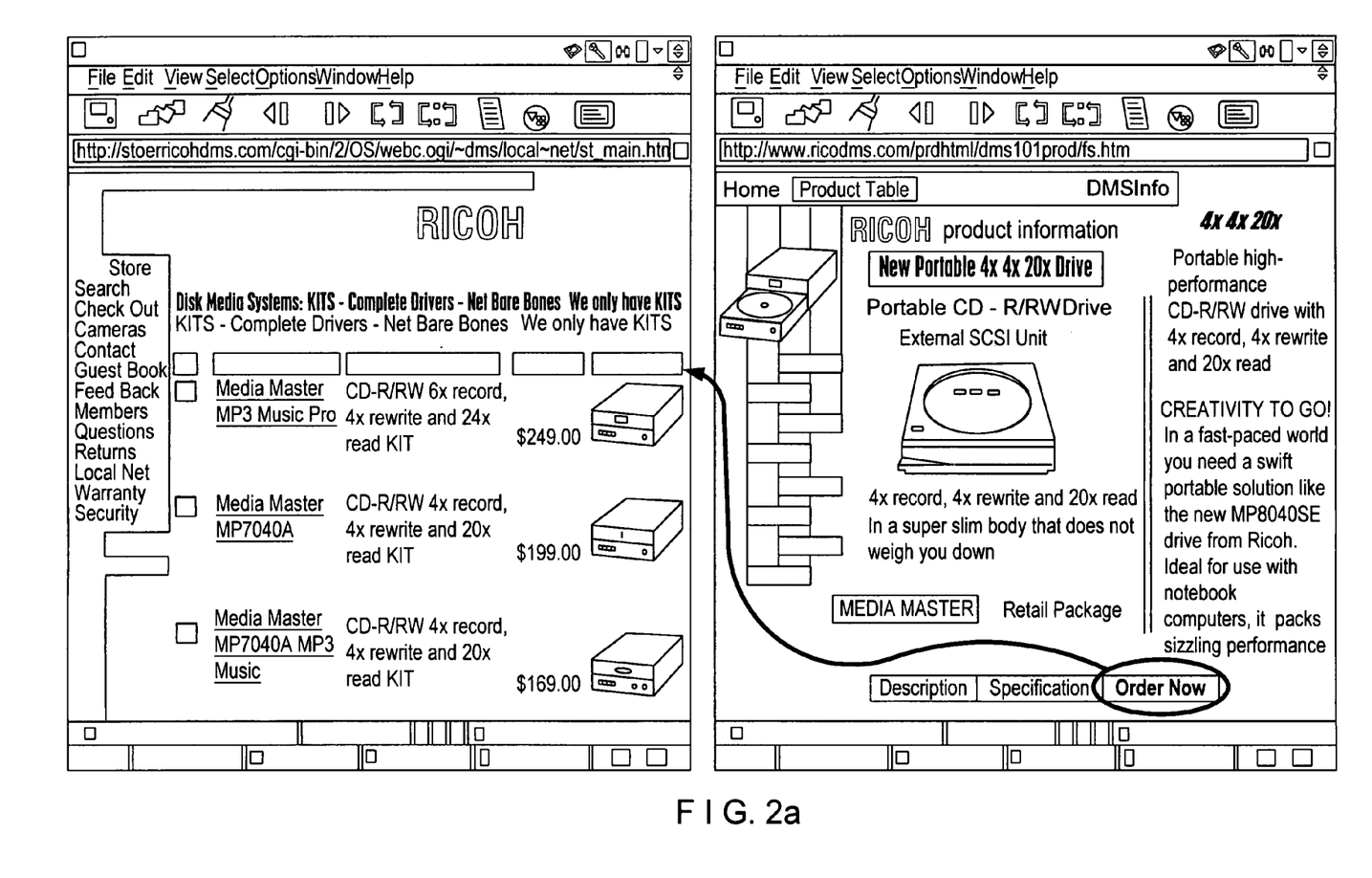
FIGS. 2a and 2b illustrate two sets of computer display screens used in a current system for ordering products over the Internet.
Figure 2B:
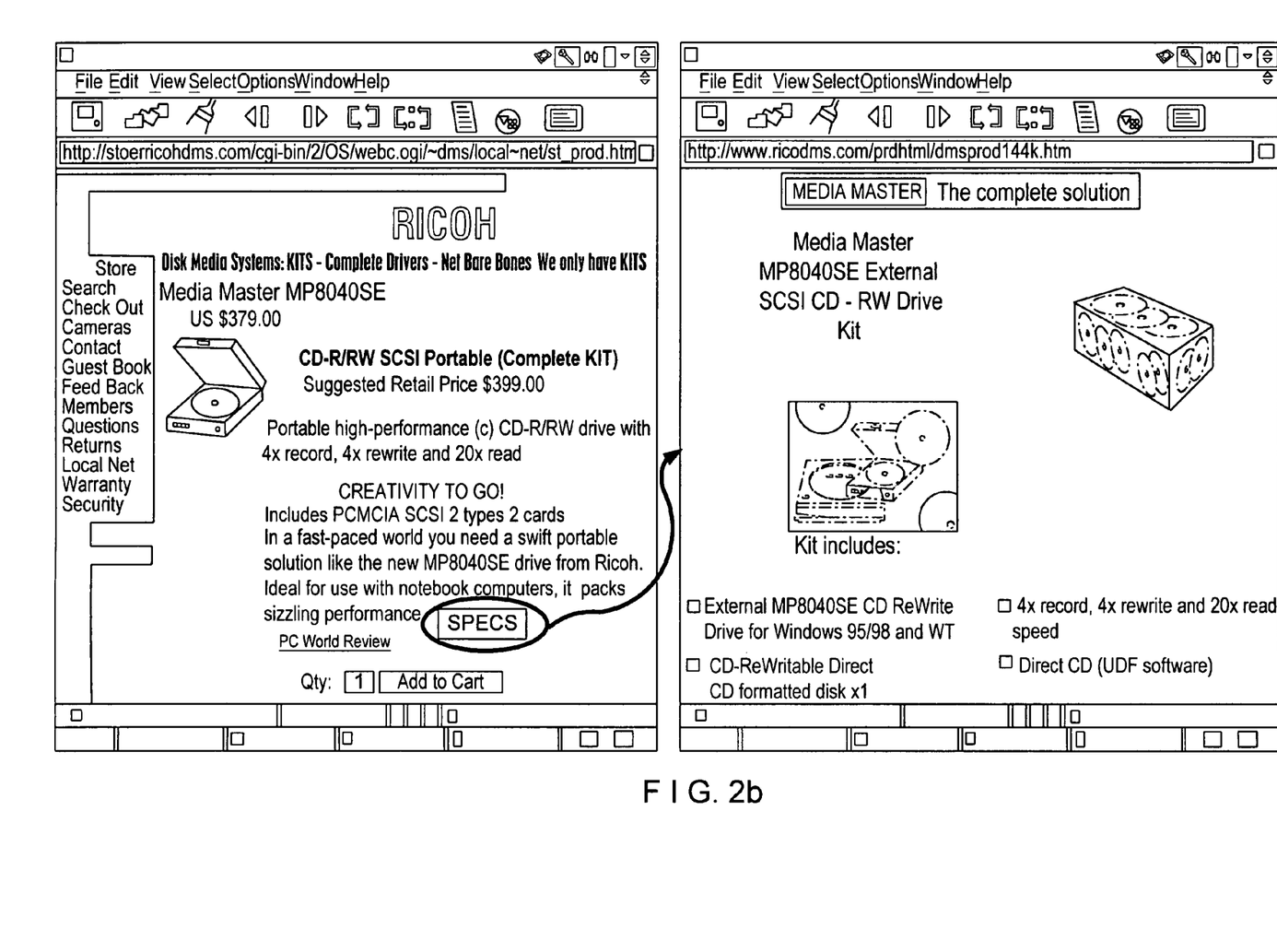
Figure 21:
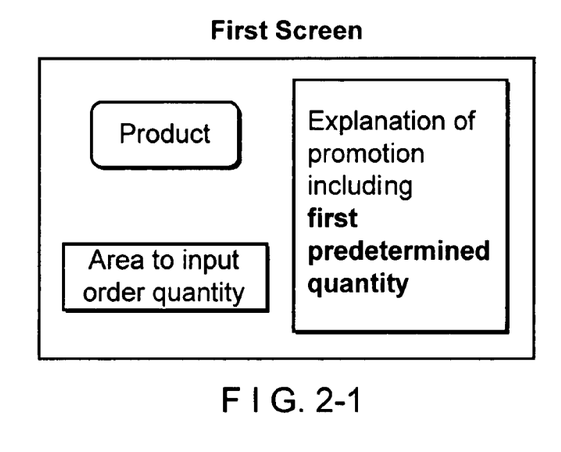

FIGS. 2*a* and 2*b* illustrate an Internet transaction that does not make use of the interactive promotion this patent specification teaches. The transaction involves an offer for and an order for a CD-RW (compact disc re-writable) drive. In FIG. 2*a* a customer side PC is transacting with a seller side (a Web site of a manufacturer Ricoh). When the customer has navigated to a product information screen (shown at the right in FIG. 2*a*) and clicks Order Now, a Store Site screen appears such as the one shown at the left in FIG. 2*a*. When the customer clicks Specs at the Store Site screen, as illustrated in FIG. 2*b* at the left, a product information screen appears as illustrated at the right in FIG. 2*b*. The customer may be unaware of special promotions that may be available depending on factors such as time of an order, quantity ordered, products to which a promotion applies, etc.

Preferred embodiments that seek to enhance Internet sales transactions through a particularly effective use of promotions are illustrated in FIGS. 2-1 through 2-4. In FIG. 2-1, a first screen containing information provided from the seller side and displayed at the customer side allows the customer to place an initial order that identifies the product and the quantity thereof included in the initial order. The screen further includes an explanation of a promotion that is available if the order includes a first predetermined quantity of the product. This promotion information may be presented to the customer as a part of the order form screen, or may be presented only after the customer enters the initial order. In the latter case, the promotion information that the seller side provides for display at this time may be selected from among different promotions so that it is particularly functionally related to the initial order. As one example, the screen can explain that if the customer orders two CD-RW drives, they will be delivered with 25 free CD-RW discs. As another example, if the customer is shopping for CD-RW discs rather than drives, the promotion information may explain that if the customer orders 40 discs, they will be delivered together with 10 free discs. If the promotion information is delivered after the customer has entered the initial order, it may be tailored even more specifically to the initial order. For example, if an additional promotion of 25 free discs is available for a customer who orders 100 discs, a customer who places an initial order for 35 discs may be advised only about the promotion involving 10 free discs while a customer who places an initial order for 80 discs may be advised only about the promotion involving 25 free discs.

Figure 22:
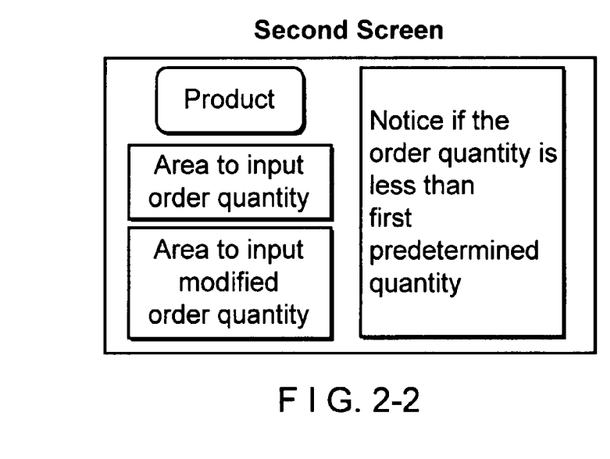

In the simplified example that only one promotion is available for disc orders, 10 free discs for an order of 40. In this case, the fist predetermined number is 40. Assume that the customer places an order for 40 discs. The seller side determines that the initial order meets the first predetermined number, automatically applies the promotion and processes the order so the customer would-receive a package of 50 discs for the price of 40. Assume as a variation that the customer's initial order is for 35 discs. In this case, the initial order has not met the first predetermined number and the seller side causes the customer side equipment to display a second screen, notifying the customer that by ordering 5 more discs, for a total of 40, ten free discs will be shipped. The notification can highlight the difference between the quantity in the initial order and that needed to qualify for the promotion. A screen of this type is the second screen illustrated in FIGS. 2-2. If the customer in response enters a revised order for 40 discs in this example, the revised order will be processed and executed. If the customer confirms the initial order for 35, then this order will be processed and executed. Assume as yet another variation that the customer's initial order is for only 2 discs, and that a second predetermined number of 5 has been set at the seller side, reflecting a belief that a customer who orders no more that 5 discs is unlikely to respond to a promotion that would deliver 50 discs, ten or more times what the customer believed his or her needs were. In this case, the seller side might not offer the second screen of FIGS. 2-2, and may simply and promptly process and execute the order for 2 discs.

Figure 23:
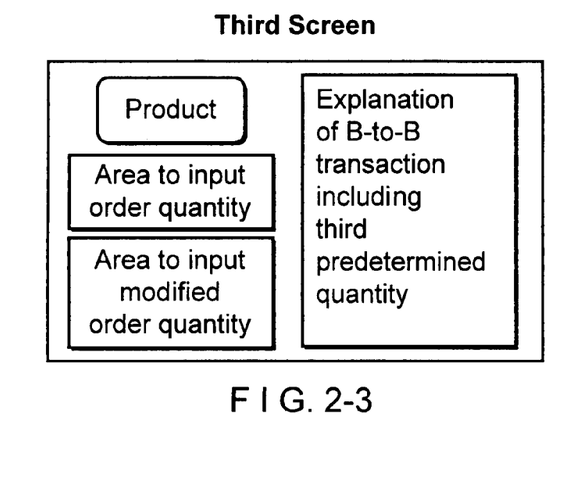
Figure 24:
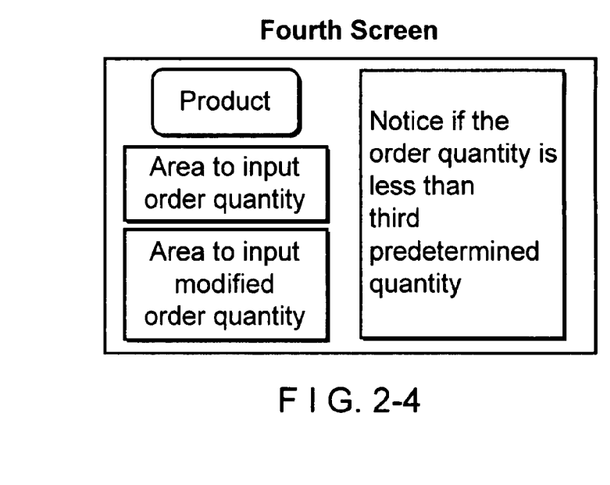

The seller side facility can identify transactions that should be treated as B2B transactions by tests such as comparing the quantity included in the initial order with a third predetermined number that is higher than the first. For example, if the initial order is for 800 CD-RW discs, a different type or promotion or different terms may be more appropriate. For example, the promotion may involve a free CD-RW drive for orders of 1000 or more discs, or it may involve a price reduction for such orders, or benefits to the customer related to payment terms or delivery methods. For B2B transactions identified by quantity information in the initial order or in some other way (such as the identity of the customer), the seller side can cause the customer side to display a screen containing information such as in the third screen illustrated in FIG. 2-3. The screen of FIGS. 2-3 includes an explanation of a B2B transaction and promotion, such as information about the third predetermined number that can be provided before or after the customer places the initial order. If the customer enters an initial order for a quantity less than the third predetermined number, the seller side can cause the display at the customer side of a screen containing information such as in the fourth screen illustrated in FIGS. 2-4, e.g., a notification of the difference between the quantity ordered and that needed to qualify for the B2B promotion.

Figure 31:
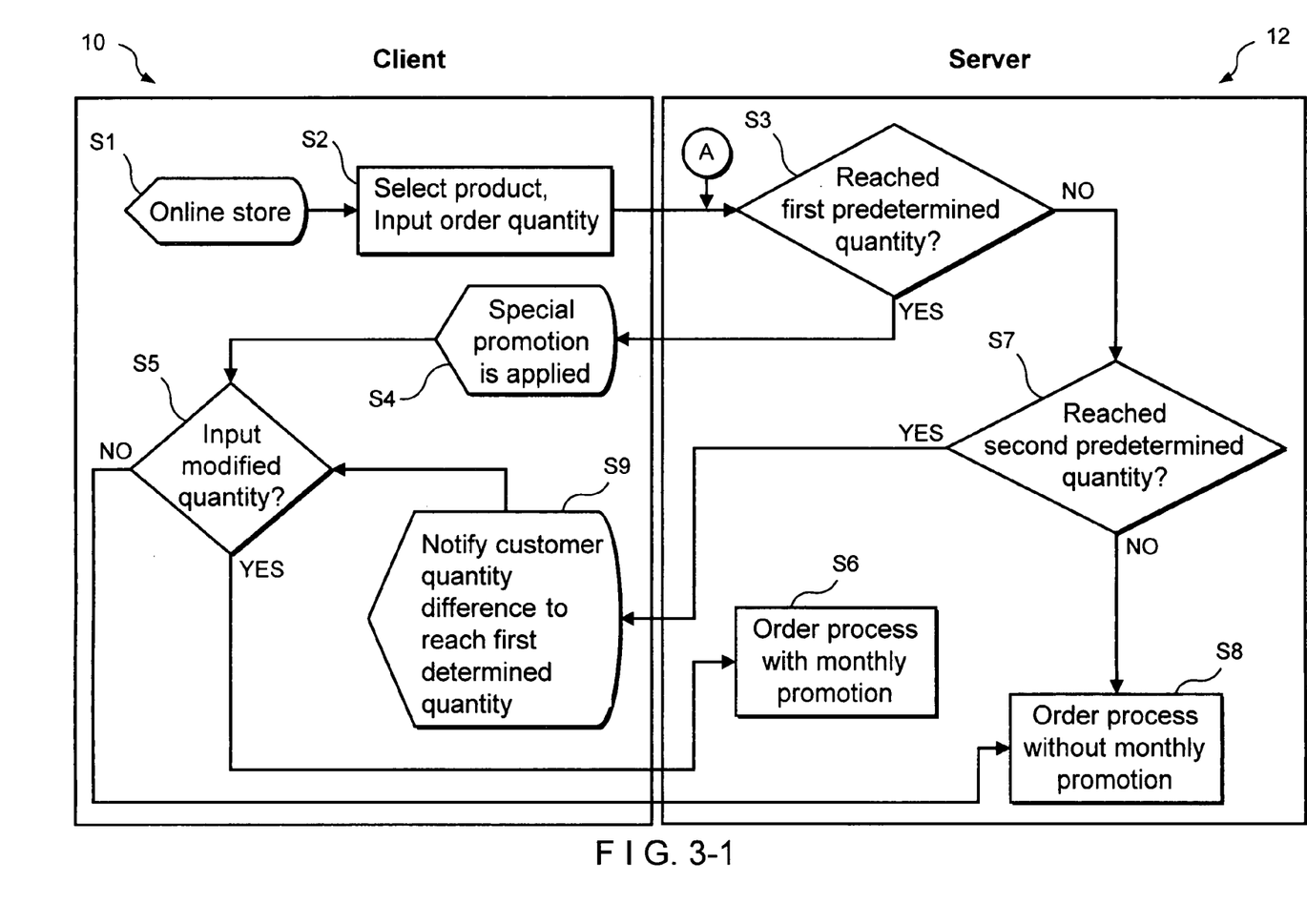

FIGS. 3-1 illustrates steps in an example of the processes referred to above. As in FIG. 1 the activities taking place at the customer side are at the left and those taking place at the seller side are at the right. At S1, the customer side displays an online store screen that typically identifies one or more products and provides for the entry of an initial order. At S2 the customer selects a product and a quantity thereof and places an initial order transmitted via the Internet to the seller side. At S3 the seller side checks if the quantity specified in the initial order equals or exceeds a first predetermine number. If the answer is yes, the appropriate special promotion is applied at S4, the customer is notified of this at S5 and the order as modified by the special promotion is treated as the inputting of a modified order. The seller side processes and executes the so-modified or revised order at S6, taking account of the fact that the promotion has been applied. If the test at S3 result in a "no" answer, another test at S7 check if the initial order reached or exceeded a second predetermined quantity. If the answer is "no," the seller side at S8 processes and executes the initial order, without applying the special promotion thereto. If the answer at S7 is "yes," the seller side notifies the customer side at S9 with a display showing the quantity difference needed to qualify for the promotion, and causes the customer side to display a screen allowing the customer to enter a modifies or revised quantity at S5. If at this time the customer confirms the initial order, that order is processed at S8 without accounting for the promotion. If the customer revises the order at S5 to make it conform to the promotion, e.g., to meet or exceed the first predetermined number, the revised order is transmitted to the seller side and processed at S6.

Figure 32:
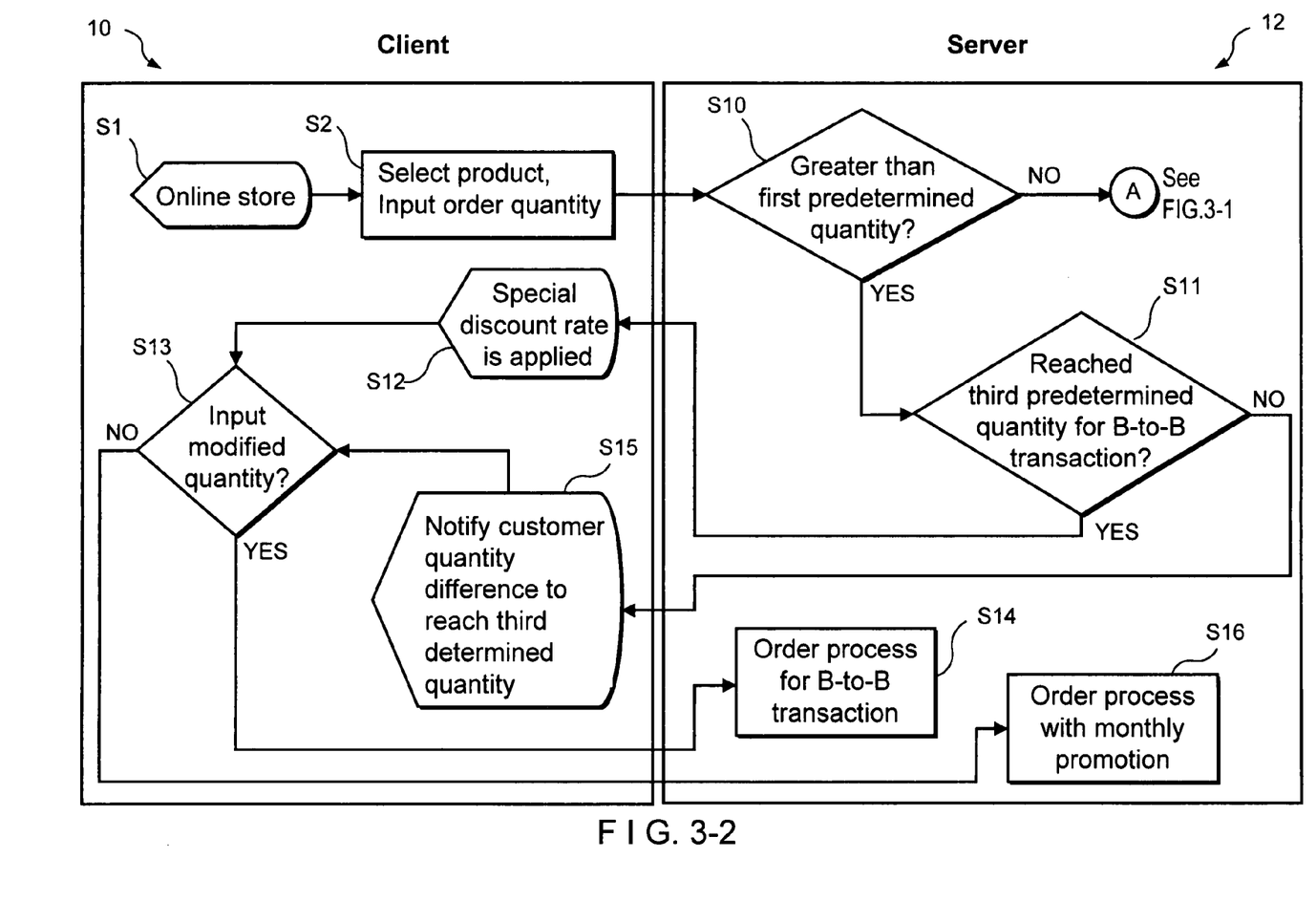

In FIGS. 3-2, steps S1 and S2 are the same as in FIGS. 3-1. However, in FIGS. 3-2 the initial order is first tested at S10 to see if the quantity ordered is greater than the first predetermined number. If the answer is "no," the process enters S3 in FIGS. 3-1 and proceeds as earlier described. If the answer at S10 is "yes," this is considered in this example as an indication that the transaction should be treated as a B2B transaction. Accordingly, at S11 the process tests whether the quantity in the initial order has reached a third predetermined number considered indicative of a B2B transaction. If the answer at S11 is "yes," and assuming that a special discount promotion is available for such transactions, that rate is applied at S12, the so-modified initial order is entered (or considered entered) at S13 and sent to the seller side where it is processed at S14 as an appropriate B2B transaction. If the answer at S11 is "no," the seller side causes at S15 the display at the customer side of a notification of the quantity difference needed to qualify for the special discount rate. If in response the customer confirms the initial order at S13, that order is processed at S16 without the benefit of the promotion, but if the customer at S13 modifies the order to make it qualify for the promotion, the so-modified or revised order is processed as B2B transaction at S14.

Figure 33:
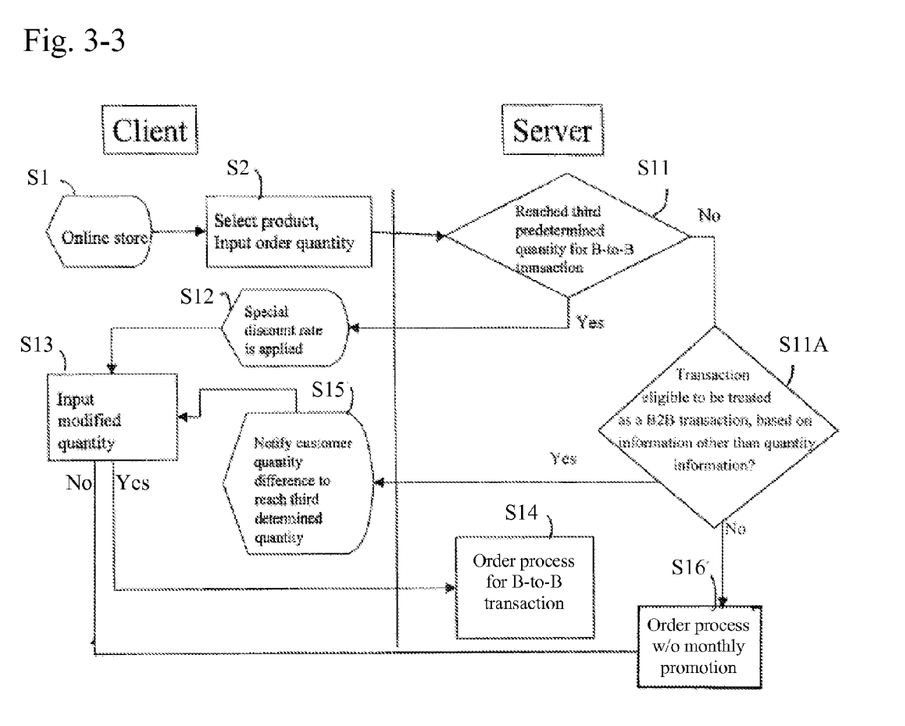

FIGS. 3-3 is similar to FIGS. 3-2. However, in FIGS. 3-3, S10 is removed and, if the answer at S11 is "no", then the flow proceeds to step S11A. In step S11A, it is determined whether the transaction is eligible to be treated as a B2B transaction based on information other than the quantity information of the initial order, as described elsewhere in this disclosure. For example, it may be determined that the transaction is eligible to be treated as a B2B transaction based on the identity of the customer, a time of the initial order, the mix of products order, requested time and mode of delivery, etc., as described elsewhere in this disclosure. If the answer at S11A is "yes", then the flow proceeds to S15. If the answer at S11A is "no" then the flow proceeds to S16.

Examples of preferred embodiments have been disclosed herein by reference to the sale of items such as disc drives and discs, but it should be clear that the disclosure is applicable to the sale of other products as well such as, without limitation, any hardware items, tickets or other benefits or privileges for which a customer may be willing to pay. Further, while the examples of promotions explained above have related to free products or discounts and the examples of order characteristics needed to qualify for a promotion have involved quantities ordered, it should be clear that other promotions, involving other benefits or privileges are also contemplated and encompassed by this disclosure, and that characteristics other than quantities ordered also are contemplated such as, without limitation, time or the initial order, the mix of product ordered, requested time and mode of delivery, etc. The scope of patent protection, therefore, is to be measured by the appended claims, as they may be modified in the course of seeking a patent.

The invention claimed is:

1. A method for enhancing product sales in network transactions, the method comprising:
   (a) delivering display information to a customer side for ordering products or services via a network;
   (b) receiving at a seller side an initial order from the customer side, said initial order comprising
      (i) customer side information including an identity of a client, and
      (ii) an initial specified quantity;
   (c) determining, with a seller side computer, based on said initial specified quantity whether said initial order is to be treated as a retail-customer-to-business transaction or as a business-to-business transaction, and
      (c1) when it is determined based on said initial specified quantity that said initial order is to be treated as a retail-customer-to-business transaction, and said specified quantity of said initial order is in a range equal to or higher than a first predetermined quantity but lower than a third predetermined quantity, changing the display information at the customer side to reflect the retail-customer-to-business transaction and a retail-customer-to-business promotion, and
      (c2) when it is determined based on said initial specified quantity that said initial order is to be treated as a business-to-business transaction, and said specified quantity is equal to or greater than said third predetermined quantity, changing the display information at the customer side to reflect the business-to-business transaction and a business-to-business promotion; and
   (d) processing and executing the order with the appropriate corresponding promotion, wherein when it is determined in (c) that the specified quantity of the initial order is lower than said third predetermined quantity, then it is determined based on said customer side information if said initial order is eligible to be treated as a business-to-business transaction, and when it is determined based on said customer side information that said initial order is eligible to be treated as a business-to-business transaction, the seller side calculates a quantity difference to qualify for the business-to-business transaction and promotion, displays the quantity difference along business-to-business transaction and promotion information at the customer side, and provides the customer side with an option of modifying the order.

2. The method of claim 1, wherein when the specified quantity of the initial order is lower than said first predetermined quantity but greater than a second predetermined non-zero quantity, the seller side calculates a quantity difference to qualify for the retail-customer-to-business transaction and promotion, displays the quantity difference along with retail-customer-to-business transaction and promotion information at the customer side, and provides the customer side with an option of modifying the order, and if the customer side confirms the initial order without modifying the initial order, the seller side determines that the initial order does not qualify as the retail-customer-to-business transaction.

3. The method of claim 1, wherein when the specified quantity of the initial order is greater than said first predetermined quantity but less than said third predetermined quantity, the seller side calculates a quantity difference to qualify for the business-to-business transaction and promotion, and displays the quantity difference along with business-to-business transaction and promotion information at the customer side display, and provides the customer side with an option of modifying the order.

4. The method of claim 3, wherein if the customer side confirms the initial order without modifying the initial order, the seller side determines the transaction does not qualify as the business-to-business transaction.

5. The method of claim 2, wherein if the specified quantity of the initial order is less than the second predetermined quantity, the initial order is processed without providing a promotion in customer side display information.

6. A system for promoting product sales in network transactions, the system comprising:
  a customer side terminal including
    an information entry part configured for user entry of an initial order,
    a display configured to display information reflecting said initial order entered through said information entry part, and
    a communication part configured to communicate information corresponding to said initial order, through a network with a seller side computer, said initial order comprising
      (i) customer side information including an identity of a client, and
      (ii) an initial specified quantity;
  wherein said customer side terminal sends said initial order to said seller side computer to enable said seller side computer to determine based on said initial specified quantity whether the initial order is to be treated as a retail-customer-to-business transaction or as a business-to-business transaction comprising a business-to-business promotion,
  wherein the display information at the customer side is changed to reflect a retail-customer-to-business transaction and a retail-customer-to-business promotion, when it is determined based on said initial specified quantity that the initial order is to be treated as a retail-customer-to-business transaction and a specified quantity of said initial order is in a range equal to or higher than a first predetermined quantity but lower than a third predetermined quantity, and
  wherein the display information at the customer side is changed to reflect a business-to-business transaction and a business-to-business promotion, when it is determined based on said initial specified quantity that the initial order is to be treated as a business-to-business transaction and said specified quantity is equal to or greater than said third predetermined quantity,
  wherein when it is determined that the specified quantity of the initial order is lower than said third predetermined quantity, then it is determined based on said customer side information if said initial order is eligible to be treated as a business-to-business transaction, and
  when it is determined based on said customer side information that said initial order in eligible to be treated as a business-to-business transaction, the seller side calculates a quantity difference to qualify for the business-to-business transaction and promotion, displays the quantity difference along with business-to-business transaction and promotion information at the customer side, and provides the customer side with an option of modifying the order.

7. The system of claim 6, wherein said customer side terminal displays promotion information corresponding to the retail-customer-to-business transaction contingent on increasing the specified quantity of the initial order to at least said first predetermined quantity, if said specified quantity of the initial order is less than said first predetermined quantity but greater than a second predetermined non-zero quantity.

8. The system of claim 6, wherein said customer side terminal displays promotion and transaction information corresponding to the business-to-business transaction contingent on increasing the specified quantity of the initial order to said third predetermined quantity, if said specified quantity of the initial order is greater than said first predetermined quantity but less than said third predetermined quantity.

9. A system for promoting product sales in network transactions, the system comprising:
  a seller side computer facility including one or more computers and
    a communication part configured to communicate through a network with a customer side terminal and receive an initial order from said customer side terminal, said initial order comprising
      (i) customer side information including an identity of a client, and
      (ii) an initial specified quantity; and
    a determination part configured to determine based on said initial specified quantity whether said initial order is to be treated as a retail-customer-to-business transaction or as a business-to-business transaction, and
    when it is determined based on said initial specified quantity that said initial order is to be treated as a retail-customer-to-business transaction, and said specified quantity of said initial order is in a range equal to or higher than a first predetermined quantity but lower than a third predetermined quantity, cause the display information at the customer side to change to reflect the retail-customer-to-business transaction and a retail-customer-to-business promotion, and when it is determined based on said initial specified quantity that said initial order is to be treated as a business-to-business transaction, and said specified quantity is equal to or greater than said third predetermined quantity, cause the display information at the customer side to change to reflect the business-to-business transaction and a business-to-business promotion, wherein when it is determined that the specified quantity of the initial order is lower than said third predetermined quantity, then it is determined based on said customer side information if said initial order is eligible to be treated as a business-to-business transaction, and when it is determined based on said customer side information that said initial order is eligible to be treated as a business-to-business transaction, the seller side calculates a quantity difference to qualify for the business-to-business transaction and promotion, displays the quantity difference along with business-to-business transaction and promotion information at the customer side, and provides the customer side with an option of modifying the order.

10. The system for promoting product sales of claim 9, wherein said determination part determines that the initial order is the business to business transaction based on the identity of the customer.

11. The system for promoting product sales of claim 9, wherein when said determination part determines said quantity information is higher than the first predetermined quantity but lower than the third predetermined quantity, said seller side computer facility displays causes said customer side to display a difference between the specified quantity of the initial order and a quantity needed to qualify for a business to business transaction and promotion, and provide the customer side with an option of modifying the initial order.

12. The system of claim 9, wherein said customer side information includes information regarding a mix of products ordered, and the determination part determines, based on said information regarding the mix of products ordered, whether said initial order is eligible to be treated as the business-to-business transaction.

13. The system of claim 9, wherein said customer side information includes an initial order time of the initial order, and the determination part determines, based on said initial order time, whether said initial order is eligible to be treated as the business-to-business transaction.

14. The system of claim 9, wherein said customer side information includes a requested delivery time, and the determination part determines, based on said requested delivery time, whether said initial order is eligible to be treated as the business-to-business transaction.

15. The system of claim 9, wherein said customer side information includes a requested delivery mode, and the determination part determines, based on said requested delivery mode, whether said initial order is eligible to be treated as the business-to-business transaction.

16. The system of claim 9, wherein the seller side calculates the quantity difference to qualify for the business-to-business transaction and promotion, if it is determined based on said customer side information that the initial order is eligible to be treated as the business-to-business transaction.

17. The system of claim 9, wherein the retail-customer-to-business transaction corresponds to a first transaction between a retail customer entity and a first business entity, and the business-to-business transaction corresponds to a second transaction between the first business entity and a second business entity.

18. The system of claim 9, wherein if it is determined based on said initial specified quantity that the initial order is not to be treated as the business-to-business transaction, and it is determined based on said customer side information that the initial order is eligible to be treated as the business-to-business transaction, then the seller side calculates the quantity difference to qualify for the business-to-business transaction and promotion, displays the quantity difference along with the business-to-business transaction and promotion information at the customer side, and provides the customer side with the option of modifying the order.

19. The system of claim 9 wherein if it is determined based on said initial specified quantity that the initial order is to be treated as the retail-customer-to-business transaction, and it is determined based on said customer side information that the initial order is eligible to be treated as the business-to-business transaction, then the seller side calculates the quantity difference to qualify for the business-to-business transaction and promotion, displays the quantity difference along with the business-to-business transaction and promotion information at the customer side, and provides the customer side with the option of modifying the order.

* * * * *